Oct. 13, 1964  K. H. HUMMEL, JR  3,153,185
ELECTRIC MOTOR WITH TRANSISTOR CONTROL
Filed Jan. 6, 1961  2 Sheets-Sheet 1
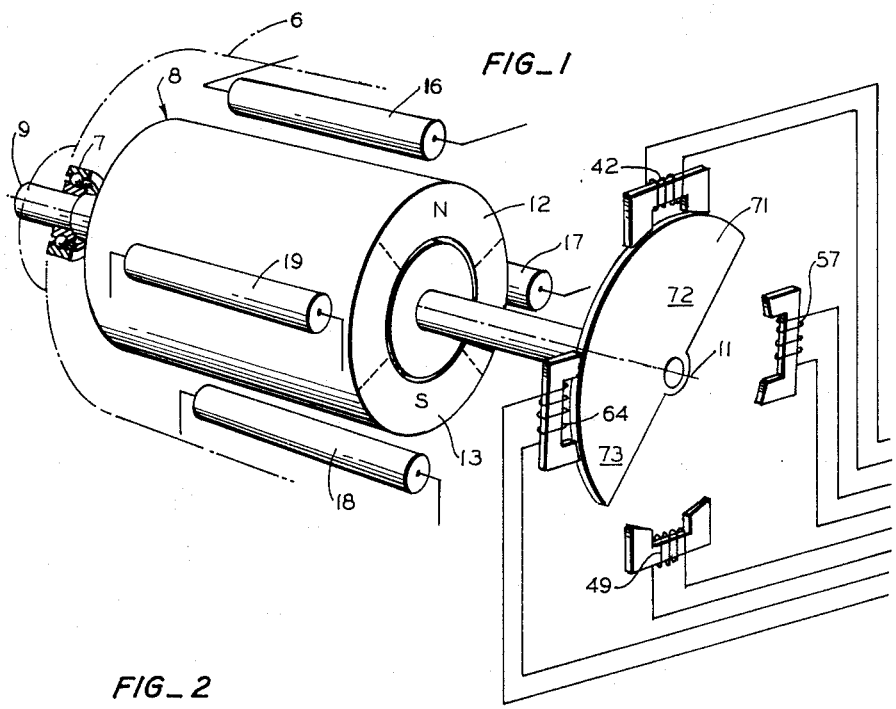
FIG_1
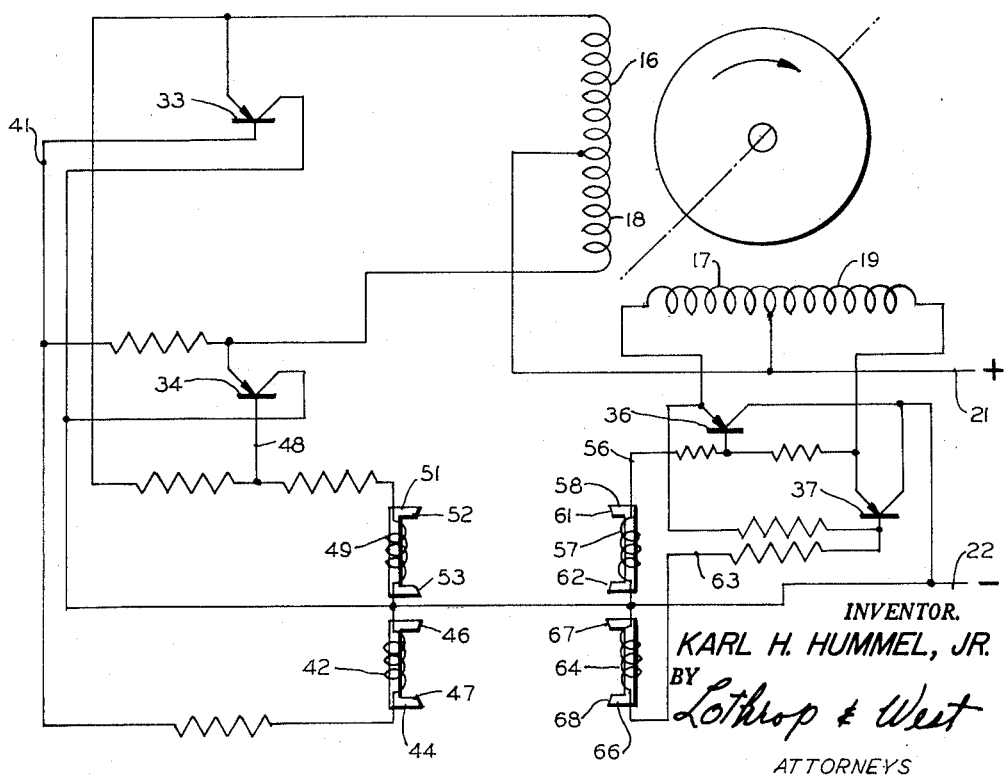
FIG_2
INVENTOR.
KARL H. HUMMEL, JR.
BY Lothrop & West
ATTORNEYS

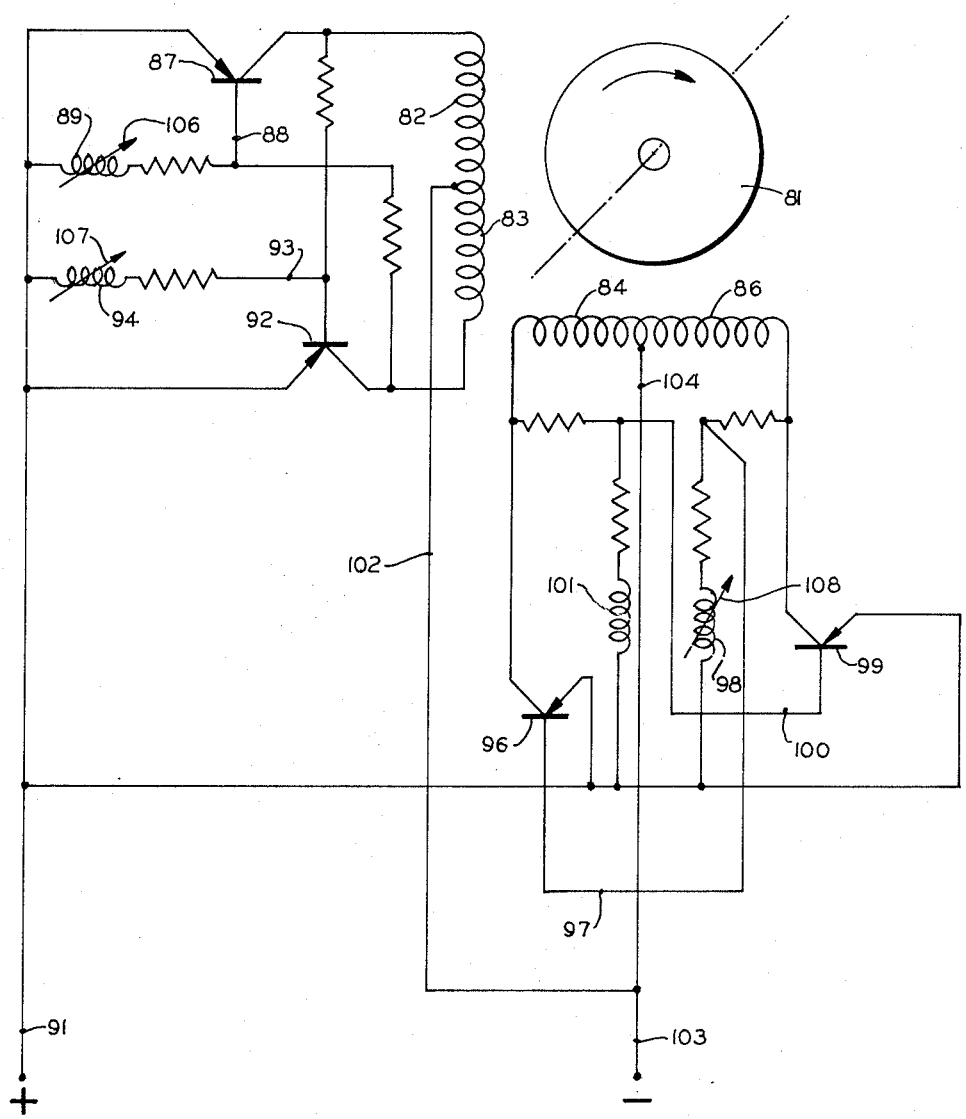

United States Patent Office 3,153,185
Patented Oct. 13, 1964

3,153,185
ELECTRIC MOTOR WITH TRANSISTOR CONTROL
Karl H. Hummel, Jr., San Jose, Calif., assignor, by mesne assignments, to Cabral Motors, Inc., Los Gatos, Calif.
Filed Jan. 6, 1961, Ser. No. 81,054
1 Claim. (Cl. 318—254)

My invention relates primarily to so-called "brushless" direct current motors and is especially concerned with motors usually made in relatively small sizes which for various reasons are not acceptable with the customary commutator and brush arrangement. "Brushless" motors are primarily useful in missile and rocket applications and the like, although they have many other uses. It is required that the motor produce no arcing even under severe attenuation of the atmosphere and that radio and other interference from electrical disturbances due to commutator and brush interengagement be eliminated.

It is also requisite that such motors be relatively insensitive to temperature conditions, to severe shock and that they have a relatively long life devoid of expensive servicing. These and other requirements are met by the elimination of the usual brush and commutator arrangement. It is required that motors of this type, despite the absence of brushes and a commutator, be effectively self-starting without outside assistance and that they operate in a selected direction.

It is therefore an object of my invention to provide an electric motor having the capability of satisfying the indicated requisites.

Another object of the invention is in general to provide an improved electric motor.

A further object of the invention is to provide an electric motor which is relatively inexpensive, effective and reliable.

Other objects together with the foregoing are attained in the embodiments of the invention described in the accompanying description and illustrated in the accompanying drawings in which:

FIGURE 1 is a diagram largely in isometric perspective showing parts of an electric motor constituted in accordance with one embodiment of the invention, much of the showing being schematic.

FIGURE 2 is a circuit diagram showing the electric circuitry usefully incorporated with the mechanism illustrated in FIGURE 1.

FIGURE 3 is another form of circuit diagram showing a variation in the electrical circuitry for an electric motor of the same general type as that illustrated in FIGURES 1 and 2.

While the invention can be incorporated in a number of different ways, depending largely upon the environmental requirements, it has successfully been operated as shown herein. In the arrangement of FIGURES 1 and 2, the electric motor is provided with a frame 6. This is illustrated in broken lines since the frame contours vary from embodiment to embodiment but always is of a standard sort. The frame includes one or more bearings 7 serving as mountings for a rotor 8 having a shaft 9. The rotor is symmetrically disposed within the frame 6 and is designed for rotation about a central axis 11.

Conveniently, although not necessarily, the rotor is made of permanently magnetic material, such as "Alnico," and is arranged so that it has localized magnetic poles. For example, the rotor has a zone 12 which is polarized north and another zone 13 which is polarized south.

Mounted on the frame 6 in appropriate array with respect to the rotor 8 are field coils 16, 17, 18 and 19. These are diagrammatically shown and are the customary field coils arranged in appropriate sequence; that is, in a circular fashion symmetrically about the axis 11 and so in circular fashion around the rotor.

Pursuant to the invention, appropriate means are provided for connecting the field coils to an appropriate source of direct electric current, for example, a battery (not shown), from which proceed leads 21 and 22, the latter being considered as the negative lead.

The coils are related to the source of direct current through appropriate devices for interrupting the current and for distributing the current to the various coils in sequence in order to produce the effect of a rotating field acting to pull the rotor around. Conveniently, each coil is provided with a transistor mechanism and certain flip-flop circuitry so that the sequential current flow is appropriately established and governed.

As especially shown in FIGURE 2, the coils 16 and 18 are considered as a first pair. The coil 16 is in circuit with a first transistor 33, while the coil 18 is in circuit with a primary transistor 34. The transistors 33 and 34 are included by appropriate connections in a flip-flop circuit so that the particular transistors 33 and 34 conduct alternately. Comparably, the coils 17 and 19 form a second pair. The coil 17 is in circuit with a second transistor 36, while the coil 19 is in circuit with a secondary transistor 37. The second pair of transistors are also included in an appropriate second flip-flop circuit so that the transistors 36 and 37 conduct sequentially.

Each of the transistors has an appropriate mechanism in its base circuit for governing inductance. For example, the first transistor 33 has a lead 41 extending from its base to an inductor 42 connected to the negative lead 22. The inductor 42 is preferably in the form of a coil on a core 44 of electromagnetic material, shaped substantially as shown and having pole ends 46 and 47. Similarly, the primary transistor 34 has a lead 48 connected to its base and connected to an inductor 49 also joined to the negative conductor 22 and wound about a core 51 having poles 52 and 53.

The second transistor 36 has a connector 56 extending from its base and connected to the negative conductor 22 through an inductor 57 similarly wound about an electromagnetic core 58 having poles 61 and 62. Finally, the secondary transistor 37 has its base connected by a conductor 63 to the negative conductor 22 through an inductor 64 wound on a core 66 with poles 67 and 68. While the arrangement of the inductors is diagrammatically shown in FIGURE 2, they are physically arranged substantially as shown in FIGURE 1. That is, the various cores are arranged on the frame 6 in a circle about the shaft axis 69 as a center with their pole pieces coplanar.

The cores are in a position to be influenced by a revolving member 71, conveniently of electromagnetic material, mounted on the shaft 9 and having a pair of contiguous quadrants 72 and 73 usually made integral and terminating in arcuate portions designed to move into close relationship with the various curved core poles and away therefrom as the rotor 8 revolves.

If some of the structure described is omitted, when the conductors 21 and 22 are connected to a source of direct current, the initial surge of current affects both of the first pair of transistors 33 and 34, for example. Which one of the transistors will first arrive at a conducting condition is indeterminate, so that it cannot be determined which of the field coils 16 and 18 will first be energized. Since the same considerations apply with the first surge of current it cannot be determined which of the secondary transistors 36 and 37 will first conduct, so that it cannot be determined which of the field coils 17 or 19 will first be effective. Thus, it is not possible to predetermine the direction of rotation of the motor or whether or not it has adequate torque to be self-starting.

But with all of the described arrangement, the motor when stopped has the mechanism 71 in some polar relationship to the electromagnetic cores. For example, the initial relationship might be as shown in FIGURE 1. In that figure, the quadrants 72 and 73 provide short magnetic paths for the inductors 42 and 64 so that the inductance of the inductors 42 and 64 is increased over the value it has when the sectors 72 and 73 are not in position. The increase in inductance in the base circuits of the transistors 33 and 37 slows the build up of current flowing to them relative to the current flow to the transistors 34 and 36. Thus, it is predetermined that the field coils 16 and 19 are first effective, whereas the coils 17 and 18 are not. This establishes an appropriate direction of the field so that the rotor 8 is given a torque in the proper direction and of considerable value effective to start the motor in the right direction of rotation with considerable force.

The rotation of the rotor carrier the mechanism 71 with it, so that as the quadrants 72 and 73 are revolved they move farther away from the core 44 and advance across the core 64 so that the inductance in the inductor 42 is considerably reduced and that in the inductor 64 remains substantially constant for a while and then in its turn is substantially reduced. The current in the circuits to the bases of the transistors 33 and 37 is considerably increased, the transistors no longer are ineffective and current is conducted to the field coils 16 and 19.

The rotation of the mechanism 71 brings the quadrants 72 and 73 into closer and closer relationship with the inductor 49 and subsequently the inductor 57 so that they in their turn have an increased inductance. The bases of the transistors 34 and 36 are connected by substantially increased inductance to the negative conductor 22 so that less current flows through the field coils 18 and 17. The angular extent of the quadrants and their positions are such that the transistors in the two flip-flop circuits are sequentially switched in a selected rotational direction. An appropriate rotating field is thus set up to continue the rotation of the rotor. By appropriately positioning the mechanism 71 with respect to the rotor 8; that is, by appropriately positioning the angular or polar position of the sectors 72 and 73 relative to the poles 12 and 13, the transistors can be made to conduct not only in sequence, but also in sequence in an appropriate direction to provide the desired direction of rotation of the field and hence of the rotor.

Under some circumstances, the arrangement shown in FIGURE 1 may stop with the mechanism 71 equally spaced relative to the inductors 42 and 64, for example. The first surge of current when the mechanism is turned on will then flow equally to the corresponding two of the transistors. The transistors themselves vary somewhat, so that the direction that the motor will then tend to turn is indeterminate. If the rotor tends to revolve in the proper direction, it will continue. But if it tends to revolve in the opposite direction, the first few degrees of backward movement of the member 71 then places the parts in position for a strong impulse in the right direction and the motor then actually turns and runs in the predetermined direction.

The reason is that the base circuit of each of the transistors is provided with an inductor and the inductances thereof are arranged to be varied by a mechanism on or controlled by the rotor itself so that the rotor in effect governs the direction of successive energization of the field coils and governs the interruptions or pulsations in the direct current. Yet, except for the bearings, this is accomplished without any mechanical or physical contact between the rotor and the casing or frame. There is no arcing or rubbing contact between the member 71 and any of the inductor cores although in many respects the inductor cores and the member 71 have timing and interrupting functions something like that of a brush and commutator arrangement. There is some electromagnetic drag between the member 71 and the various cores, but the quantity of drag is small relative to the other quantities involved and is negligible.

Under some circumstances, it is possible to provide some of the advantages of the structure shown in FIGURES 1 and 2 without employing the rotating member 71. As shown in FIG. 3, the rotor 81 is provided with field coils 82 and 83 as a first pair and field coils 84 and 86 as a second pair. The coil 82 has its transistor 87 having a conductor 88 to its base which leads through an inductor 89 to a lead 91 extending from a suitable source of direct current such as a battery (not shown). Similarly, the coil 83 has a transistor 92 connected by a lead 93 to an inductor 94 also joined to the lead 91. A transistor 96 is connected to the field coil 84 and has a lead 97 from its base to an inductor 98 joined to the conductor 91. Furthermore, the coil 86 is connected to a transistor 99 the base of which is joined by a lead 100 to an inductor 101 connected to the conductor 91. The remaining circuitry is substantially standard, it being noted only that the coils 82 and 83 have a center tap joined by a conductor 102 to the lead 103 from the other side of the battery, while the coils 84 and 86 also have a center tap joined by a lead 104 to the conductor 103.

If the various transistors 87 and 92 of the first pair and 96 and 99 of the second pair were simply connected to the current source, the direction of rotation and the amount of field available for the rotor 81 would be indeterminate. Consequently, I provide that the inductor 89 be variable as indicated by the arrow 106 and that the inductor 94 also be made variable by a mechanism represented by the arrow 107. Thus, by appropriate movement of either the mechanism of the arrow 106 alone or the mechanism 107 alone or of both mechanisms 106 and 107 together, the ratio of inductances between the inductors 89 and 94 can easily be set. If desired, the setting can be made so that the transistor 87 will always conduct or "fire" ahead of the transistor 92. This assures that the coil 82 is always effective before the coil 83, for example.

Similarly, the inductor 98 can also be provided with a variable mechanism represented by an arrow 108. While the inductor 101 can also be made in a similar fashion with a variable mechanism, this is not essential since the inductor 101 can be considered as a datum point and all of the other inductors can be adjusted relative to it. That is, by the manipulation of the mechanism represented by the arrow 108 the inductance of the inductor 98 can be made greater than or less than that of the inductor 101. The inductors can all be adjusted to predetermined or set values of inductance so that the sequence of conduction to the various individually connected field coils can be predetermined and established. Thus, the motor can always be made to start in the same direction and to run correspondingly with substantial torque. By changing the relative value of the inductors, the motor can also be made to shift or reverse its direction of rotation since the direction of rotation of the field is reversed.

By these means it is possible to ensure that the motor is supplied with interrupted, direct current energy for its field and that the interrupted energy to the field is distributed to the successive field coils in appropriate sequence to ensure the desired rotation of the rotor.

What is claimed is:

An electric motor with transistor control comprising a frame, a rotor, means for mounting said rotor for rotation in said frame, first and second pairs of field coils on said frame around said rotor, an electric circuit connected to said first pair of field coils and including a first flip-flop network, a first pair of transistors included in complementary positions in said first flip-flop network, a first inductor in said first network in the base circuit of one of said first pair of transistors, a primary inductor in said first network in the base circuit of the other of said first pair of transistors, means for setting the inductances of said first and primary inductors at a predetermined ratio, an electric circuit connected to said second pair of field coils and including a second flip-flop network, a second pair of transistors included in complementary positions in said second flip-flop network, a second inductor in said second network in the base circuit of one of said second pair of transistors, a secondary inductor in said second network in the base circuit of the other of said second pair of transistors, and means for setting the inductances of said second and secondary inductors at a predetermined ratio to each other and relative to the inductances of said first and primary inductors.

References Cited in the file of this patent

UNITED STATES PATENTS

| | | |
|---|---|---|
| 2,867,762 | Lehman et al. | Jan. 6, 1959 |
| 2,980,939 | Haeusserman | Apr. 18, 1961 |
| 3,090,897 | Hammann | May 21, 1963 |